United States Patent [19]

Jensen

[11] 3,898,650

[45] Aug. 5, 1975

[54] TAPE RECORDING SYSTEM FOR RADAR

[75] Inventor: Garold K. Jensen, Alexandria, Va.

[73] Assignee: The United States of America as represented by the Secretary of the Navy, Washington, D.C.

[22] Filed: Apr. 2, 1969

[21] Appl. No.: 812,933

[52] U.S. Cl. ............................................. 343/5 PC
[51] Int. Cl.² .......................................... G01S 7/02
[58] Field of Search .............. 343/5 R, 17.1 R, 5 PC

[56] References Cited
UNITED STATES PATENTS

| | | | |
|---|---|---|---|
| 2,978,697 | 4/1961 | Donath et al. ........................... | 343/5 |
| 3,063,040 | 11/1962 | Drukey et al. .............. | 343/17.1 UX |
| 3,201,787 | 8/1965 | Grewe et al. .................. | 343/17.1 X |

*Primary Examiner*—T. H. Tubbesing
*Attorney, Agent, or Firm*—R. S. Sciascia; Arthur L. Branning

[57] ABSTRACT

A tape recording system particularly useful in reducing the large dynamic range of signals present in the receiver of an over-the-horizon radar to a level which is within the capability of commercially available tape recorders. To accomplish this, the invention uses filtering and signal stretching techniques.

4 Claims, 1 Drawing Figure

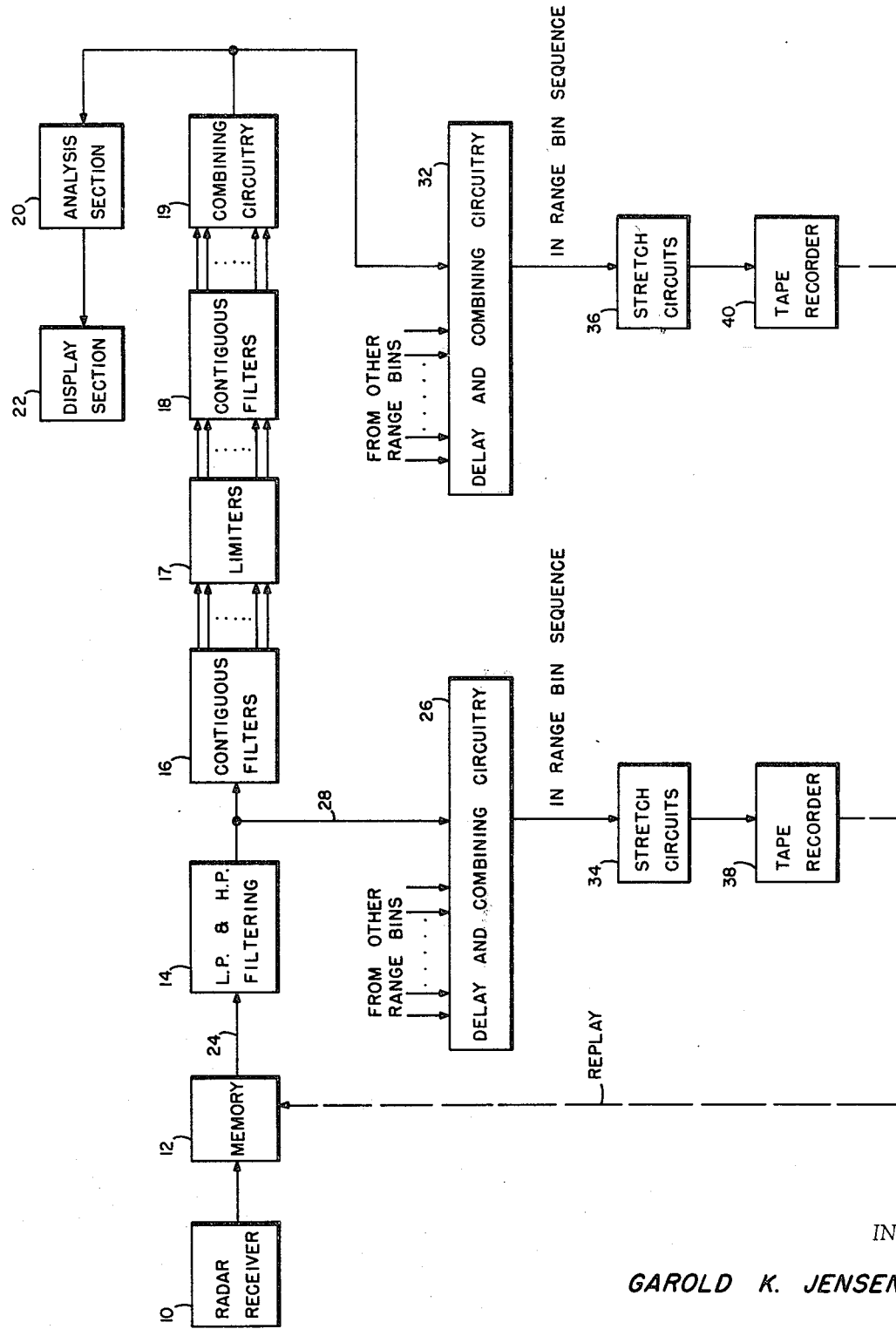

TAPE RECORDING SYSTEM FOR RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the interest of the nation's security, the government has developed long range, over-the-horizon (o-t-h) radars. These o-t-h radars must necessarily handle and retrieve extremely weak signals in the presence of relatively strong backscatter and other clutter. It is not unusual in o-t-h radars to require the receiver and signal processing units to have a dynamic range capability of 120 dB and more.

The reader will, of course, recognize that in the use that is made of o-t-h radars, it would be very desirable, for purposes of subsequent evaluation and reproduction, to have a perservable record, such as a tape recording, of the receiver signal. Prior to this invention, such a record could not be made since suitable tape recorders having a 120dB dynamic range were not available.

SUMMARY OF THE INVENTION

This invention allows commercially available tape recorders to be used to provide a permanent record (capable of being reused) of the o-t-h radar receiver signal. After being stored in a capacitive type matrix memory, the receiver output is processed by filtering, limiting and signal stretching techniques to lower the dynamic range to a level which is within the dynamic range capability of over-the-counter equipment.

OBJECTS OF THE INVENTION

It is, therefore, an object of the invention to provide an improved radar system.

A further object is to provide a tape recording system that is particularly suitable for use with an o-t-h radar.

Another object of the invention is to allow the use of commercially available tape recorders to provide a permanent record of a signal having dynamic and frequency ranges that are higher than the normal capability of the recorder.

A still further object of the present invention is the provision of circuitry wherein the high dynamic range o-t-h radar receiver signal is altered after time compression by filtering, limiting and signal stretching techniques to have frequency and dynamic ranges which are within the capability of commercially available tape recorders.

BRIEF DESCRIPTION OF THE DRAWINGS

The exact nature of this invention, as well as other objects and advantages thereof, will be readily apparent from consideration of the following specification relating to the annexed drawing in which the single FIGURE illustrates an embodiment of the invention in block diagram form.

DESCRIPTION OF THE PREFERRED EMBODIMENT

Referring now to the drawing, the receiver 10 of an o-t-h radar is connected to a memory device 12 that is connected in turn through high and low pass filter circuits 14, first contiguous filters 16, limiters 17, second contiguous filters 18, combining circuitry 19 and an analysis or information retrieval section 20 to display devices 22. The preceding sentence refers to an illustration of an almost complete radar, excepting the transmitter. This illustration has been extremely simplified both for the purpose of emphasizing the invention, ie. the additional circuitry yet to be described, and for the purpose of avoiding unnecessary complications of description and illustration. Readers wishing a more detailed description of o-t-h radars, such as are contemplated in components 10–22, are referred to Pat. application, Ser. No. 649,792 filed by Garold K. Jensen on June 27, 1967 for RADAR DATA CONVERTER AND DISPLAY SYSTEM and to Pat. application, Ser. No. 650,157 filed by Garold K. Jensen on June 27, 1967 for RADAR SIGNAL ANALYZING SYSTEM.

For the purposes of this disclosure, it is only necessary for the reader to realize (as is well known in the prior art) that the receiver signal, having a typical dynamic range of 120 dB, is connected to memory 12 where it is repetitively sampled and sequentially connected (in synchronism with the transmitter pulse) to be segregated by range into so-called range bins which physically may be either a sector of a rotating magnetic drum or a row in a matrix of capacitor stores. The memory readout is a rapid readout of the individual range bins either in sequence or in parallel, the latter allowing swifter data processing and display. The rapid readout produces a large time compression and also results in frequencies which are beyond the capability of commonly available tape recorders. If the range bin readout is in sequence, the shown connection 24 between member 12 and filtering circuits 14 does not require further comment; the output of the memory being filtered by components 14 to remove the large portion of the receiver signal which is due to backscatter return from stationary objects.

However, if the range bins read out in parallel, the lead 24 and the filtering unit 14 are symbolic of a plurality of such units arranged in parallel. By obvious delay and adding techniques, the outputs of the range bins, filtered to remove the backscatter portion, are chronologically arranged in the correct sequential order in component 26 which is connected by lead(s) 28 to the outputs of the filters 14. In other words, the output signal of unit 26 is the same whether the range bin readout from memory 12 is by sequence or in parallel.

The output, or outputs, of filtering circuits 14 are also (individually) connected to a narrow-banding device such as contiguous filter(s) 16, each of which has a plurality of outputs that are related to very small doppler frequency ranges. The dynamic range of the outputs of contiguous filters 16 are further reduced by amplitude limiters 17 which are in turn connected to second contiguous filters 18 (that can be the same as filters 16) wherein undesirable effects (harmonics) of the limiting process are removed. The output signals of contiguous filters 18 are connected to combining circuitry 19 which is in turn connected to analysis circuits 20 where information retrieval is accomplished, typically by acceleration profile matching techniques that are more fully described in the above mentioned prior patent applications.

As previously described, the receiver output signal typically has a dynamic range of as much as 120 dB.

This is reduced to a great extent by the filters 14 that eliminate the backscatter and other clutter return. Depending upon the enemy jamming and other interference present, the dynamic range of the output signal of filtering circuits 14 is typically between 40 and 80 dB, which may or may not be within the 50 dB dynamic range capability generally found in commercially available tape recorders.

Contiguous filters 16, limiters 17 and second contiguous filters 18 further reduce the dynamic range of the signal, typically to a level of 20–30 dB. The output signals of contiguous filters 18 are therefore well within the 50 dB dynamic range capability of commercially available tape recorders. Therefore, the invention contemplates the desirability of, and makes provisions for, recording the outputs of both the filters 14 and the combined outputs of filters 18. As previously discussed in connection with component 26, if the range bin readout of memory 12 is in parallel, signals from the other range bins are chronically arranged in the correct sequential order by delay and combining circuitry 32, which is similar to circuitry 26, and which is connected, as shown, to the output of combining circuit(s) 19.

Because of the previously discussed time compression in the readout of memory 12, the outputs of circuits 26 and 32 contain high frequencies which are beyond the frequency range capability of commercially available recorders. For this reason the circuits 26 and 32 are connected to boxcar or stretch circuits 34 and 36, which typically could be a series connected threshold circuit and a monostable multivibrator. Circuits 34 and 36 respond to very short signals above a given threshold and in effect stretch such very short signals and set a lower limit on the duration of the signals applied to the tape recorders 38 and 40 which are connected to the stretch circuits 34 and 36 respectively. The period of the monostable multivibrator in the stretch circuits 34 and 36 is preferrably by design inversely related to and, in effect reverses, the time compression in the readout of memory 12 so that the tape record will thereby more closely approximate the radar receiver signal before time compression. In other words, the shortening of the signal resulting from time compression in the readout of memory 12 is compensated for by the lengthening of signals in the stretch circuits 34 and 36.

By now the operation of the invention will be apparent. During the operation of the radar, continual records are made on tape recorders 38 and 40 which, of course, may be in the form of a single two track recorder if so desired. If an incident, such as a false alarm or a miss of a known target occurs, the tape records can be played back through memory 12 for further analysis. The record from recorder 38 will be a good reproduction (without backscatter) of the signal from receiver 10 during the incident being investigated, if enemy jamming or other interference has not caused the dynamic range of the output signal of filtering 14 to exceed the capability of recorders 38. In the latter event, the record in tape recorder 40 will be used. This record will have been modified by the limiters 17 but will provide a sufficiently accurate reproduction of the signal from receiver 10, during the incident being investigated, to allow meaningful further investigation.

The reader will recognize that the invention that has been disclosed provides circuitry wherein the time compressed, high dynamic range o-t-h radar receiver signal is altered by filtering, limiting and signal stretching techniques to have frequencies and dynamic ranges which are within the capability of commercially available tape recorders, thereby allowing the use of such recorders to make a record of the radar signal for purposes of subsequent further analysis.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. In a radar system wherein the receiver signal is in turn stored in a memory means, read out with time compression, filtered to remove backscatter, narrowbanded by contiguous filter and limiter means, analyzed and displayed, a tape recording system comprising:

First signal stretching means connected to receive said receiver signal after the backscatter is removed by filtering but before the signal is narrowbanded by said contiguous filter and limiter means, said first signal stretching means functioning to stretch signals in a manner inversely related to said time compression and A first tape recorder connected to said first signal stretching means.

2. The tape recording system of claim 1 and further including:

Second signal stretching means connected to receive said receiver signal after the signal is narrowbanded by said contiguous filter and limiter means and functioning to stretch signals in a manner inversely related to said time compression and A second tape recorder connected to said second signal stretching means.

3. A radar receiver and display system comprising:

A radar receiver, the output signal of which has a large dynamic range;

Memory means connected to said radar receiver and functioning to receive and store said receiver output signal and to read out said stored signal with time compression;

Filtering means connected to the output of said memory means and functioning to block the portion of the memory output signal that results from stationary targets;

Contiguous filter means connected to said filtering means and producing a plurality of parallel output signals in a plurality of very narrow adjacent frequency ranges;

Limiter means connected to the parallel outputs of said contiguous filter means and functioning to limit the amplitude of each of the plurality of parallel output signals;

Analysis and display sections connected to said limiter means;

First signal stretching means connected to the output of said filtering means and functioning to stretch signals in a manner inversely related to said time compression in said memory means readout and A first tape recorder connected to said first signal stretching means Whereby said filtering means and said first signal stretching means modify the dynamic and frequency range of the readout of said memory means in such a manner that said first tape recorder can have reduced capabilities.

4. The radar receiver and display system of claim 3 and further including:

Combining circuitry means connected to the parallel outputs of said limiter means and functioning to combine the parallel outputs of said limiter means into a single output, Second signal stretching means connected to said combining circuitry means and functioning to stretch signals in a manner inversely related to said time compression in said memory means readout and A second tape recorder connected to said second signal stretching means Whereby said contiguous filter and limiter means and said second signal stretching means further modify the dynamic and frequency range of the readout of said memory means in such a manner that said second tape recorder can have capabilities less than said first tape recorder.

* * * * *